United States Patent [19]

Yang

[11] Patent Number: 4,854,740

[45] Date of Patent: Aug. 8, 1989

[54] WEAR REDUCTION MEMBER FOR ENGINE

[76] Inventor: Ping Yang, 8220 Dorothy St., Rosemead, Calif. 91770

[21] Appl. No.: 219,187

[22] Filed: Jul. 15, 1988

Related U.S. Application Data

[60] Division of Ser. No. 939,079, Dec. 8, 1986, Pat. No. 4,802,449, which is a continuation-in-part of Ser. No. 753,670, Jul. 10, 1985, Pat. No. 4,651,690, which is a continuation-in-part of Ser. No. 646,773, Sep. 4, 1984, abandoned.

[51] Int. Cl.[4] ........ F16C 29/02

[52] U.S. Cl. ........ 384/42; 384/37

[58] Field of Search ........ 384/20, 10, 15, 42, 384/37; 277/30, 181

[56] References Cited

U.S. PATENT DOCUMENTS 3,885,837 5/1975 Melloro ........ 384/42

4,044,728 8/1977 Moeller ........ 123/193 R 4,440,095 4/1984 Mathieu ........ 384/42 X

*Primary Examiner*—Daniel P. Stodola

*Assistant Examiner*—John M. Eghtessad

*Attorney, Agent, or Firm*—Cislo & Thomas

[57] ABSTRACT

An internal combustion engine comprising a combustion chamber having at least two rigidly fixed inner wall surfaces and at least three movable inner wall surfaces reciprocally mounted and adapted to reciprocate from a first position lessening the internal volume of the combustion chamber to a second position expanding the internal volume of the combustion chamber. The reciprocal linear movements of the movable, inner wall surfaces are operatively coupled to a crankshaft. A spark plug is secured in the combustion chamber and has the spark gap terminals thereof extending into the combustion chamber. A pair of inlet and exhaust valves disposed in the combustion chamber and opening inwardly thereunto complete the major components of the novel engine.

2 Claims, 6 Drawing Sheets

WEAR REDUCTION MEMBER FOR ENGINE

CROSS-REFERENCE TO RELATED APPLICATIONS

The present patent application is a divisional application of application Ser. No. 06/939,079, filed Dec. 8, 1986 now U.S. Pat. No. 4,802,449 which in turn is a continuation-in-part application of application Ser. No. 06/753,670, filed July 10, 1985 now U.S. Pat. No. 4,651,690, which is a continuation-in-part application of Ser. No. 06/646,773, filed Sept. 4, 1984 now abandoned.

BACKGROUND OF THE INVENTION

This invention relates to an internal combustion engine having at least three movable sidewalls and two stationary walls where the movable walls move substantially simultaneously.

In the usual internal combustion engine having a combustion chamber formed from rigid sidewalls with only a single movable member acting as a piston to drive a crankshaft or like power train means, the movement of expanding gases normal to the axis of piston movement is wasted in that the energy exerted by these forces does not add to the downward force of gases expanding parallel to the axis of piston movement. Thus, forces potentially additive to the harnessed downward driving force being exerted against the piston head are being wasted against the rigid sidewalls forming the combustion chamber. This invention harnesses these presently wasted forces by providing movable sidewalls acting as pistons in one or multiple planes so as to be acted upon by forces that are directed in planes other than unidirectionally downward.

U.S. Pat. No. 3,692,005 to Buske is also directed to providing movable sidewalls acting as pistons. However, there are deficiencies in this patent. The present invention solves the problems of the Buske engine so that the internal combustion engine using movable walls would be able to minimize the friction of the movable walls and the production costs as well as the torque that exists in the engine.

The Buske patent utilizes a hedron with springs as a means to seal the combustion chamber. Accordingly, a minimum thickness of the chamber must be maintained as a condition of self sealing.

Further, the position where force applied on the chamber wall when the gas explodes (at the middle of the chamber wall) is not in line with the position where the hedrons transfer thrust to the gear. Thus, torque exists, which will make the hedron wear out unevenly.

OBJECTS AND SUMMARY OF THE INVENTION

It is an object of the present invention to provide an internal combustion engine having greater efficiency than existing internal combustion engines.

It is another object of the present invention to provide an internal combustion engine that is economical in construction and in fuel usage.

It is yet another object of the present invention to provide an internal combustion engine that is relatively maintenance free and capable of easy maintenance when repair or adjustment becomes necessary to its continued operation.

It is still another object of the present invention to provide an internal combustion engine wherein the combustion chamber of the internal combustion engine has at least three movable sidewalls capable of independent reciprocal movement with respect to at least two rigidly fixed sidewalls that are capable of greater efficiency by harnessing the otherwise wasted energy of combusting forces which are not directional along the longitudinal axis of the single piston taught in the prior art.

It is a still further, more important object of the present invention to provide an internal combustion engine having comparatively simple means for translating the reciprocal motion of the sidewalls into rotary motion suitable for coupling into a crankshaft.

It is a yet further, more important object of the present invention to provide an internal combustion engine having movable sidewalls in which the friction is minimized.

It is yet another, more important object of the present invention to provide an internal combustion engine having movable sidewalls in which torque against the sidewalls is eliminated by directing the position of force on the chamber wall after ignition of gases to be in line with the position where thrust transfer outwards occurs, thereby eliminating imbalance and uneven wear of parts.

These and other objects of the invention will become more apparent from the following commentary taken in conjunction with the following figures of drawings.

Briefly, the apparatus of the invention taught herein comprises in a first preferred embodiment, a combustion chamber having at least two rigidly fixed inner wall surfaces and at least three movable inner wall surfaces reciprocally mounted therein and adapted to reciprocate from a first position lessening the internal volume of the combustion chamber to a second position expanding the internal volume of the combustion chamber; ignition means secured in the combustion chamber adapted to selectively ignite a gas contained in the combustion chamber; and means for permitting the gas to selectively enter into and exit from the combustion chamber.

Each wall surface is defined by a relatively thin rigid wall, one end of each wall being in slidable moving contact with an inner wall surface of an adjacent wall. An elongated extension is attached to the exterior of each movable wall, adjacent the wall-contacting end and extending substantially parallel to the adjacent inner wall surface. The elongated extension provides reciprocal linear motion in response to the movement of the wall to which it is attached. Means are provided on the adjacent inner wall surface for supporting the extension and for translating the reciprocal linear motion into rotary motion. Means are also provided for coupling the rotary motion derived from each of the movable walls into synchronous rotary motion, suitable for coupling to a crankshaft.

Another preferred embodiment of the apparatus of the invention comprises a combustion chamber having a rectangular shape and at least two rigidly fixed inner wall surface and three movable inner wall surfaces reciprocally mounted therein adapted to reciprocate from a first position lessening the internal volume of the combustion chamber to a second position expanding the internal volume of the combustion chamber; the three movable inner wall surfaces are cooperatively associated to remain in the first position lessening the internal volume of the combustion chamber by reason of their interconnection to a common crankshaft much like that found in the common piston, internal combustion engine; a spark plug secured in the combustion chamber and having the spark gap terminals thereof extending into the combustion chamber; and a pair of inlet and exhaust valves disposed in the combustion chamber and opening inwardly thereinto.

In this embodiment, and elongated extension bar is positioned orthogonal to the exterior of a movable wall which is movable both laterally and orthogonally. At the wall-attaching end, the elongated extension bar is provided with gear means to cause the movable wall to move laterally by coupling to a bar secured to the wall exterior and provided with teeth. The opposite end of the elongated extension bar is coupled to corresponding ends of the other elongated extension bars associated with the movable walls and the combined orthogonal motions are collected and converted into linear motion for driving a crankshaft.

Alternate means are also provided for permitting contraction and expansion of the combustion chamber by in and out motion of the movable walls coupled to tracks. Finally, a U-shaped member analogous to a piston ring is provided for preventing loss of sealing of the combustion chamber due to wear of the edges of the movable walls.

BRIEF DESCRIPTION OF THE PREFERRED EMBODIMENTS

Figure 1:
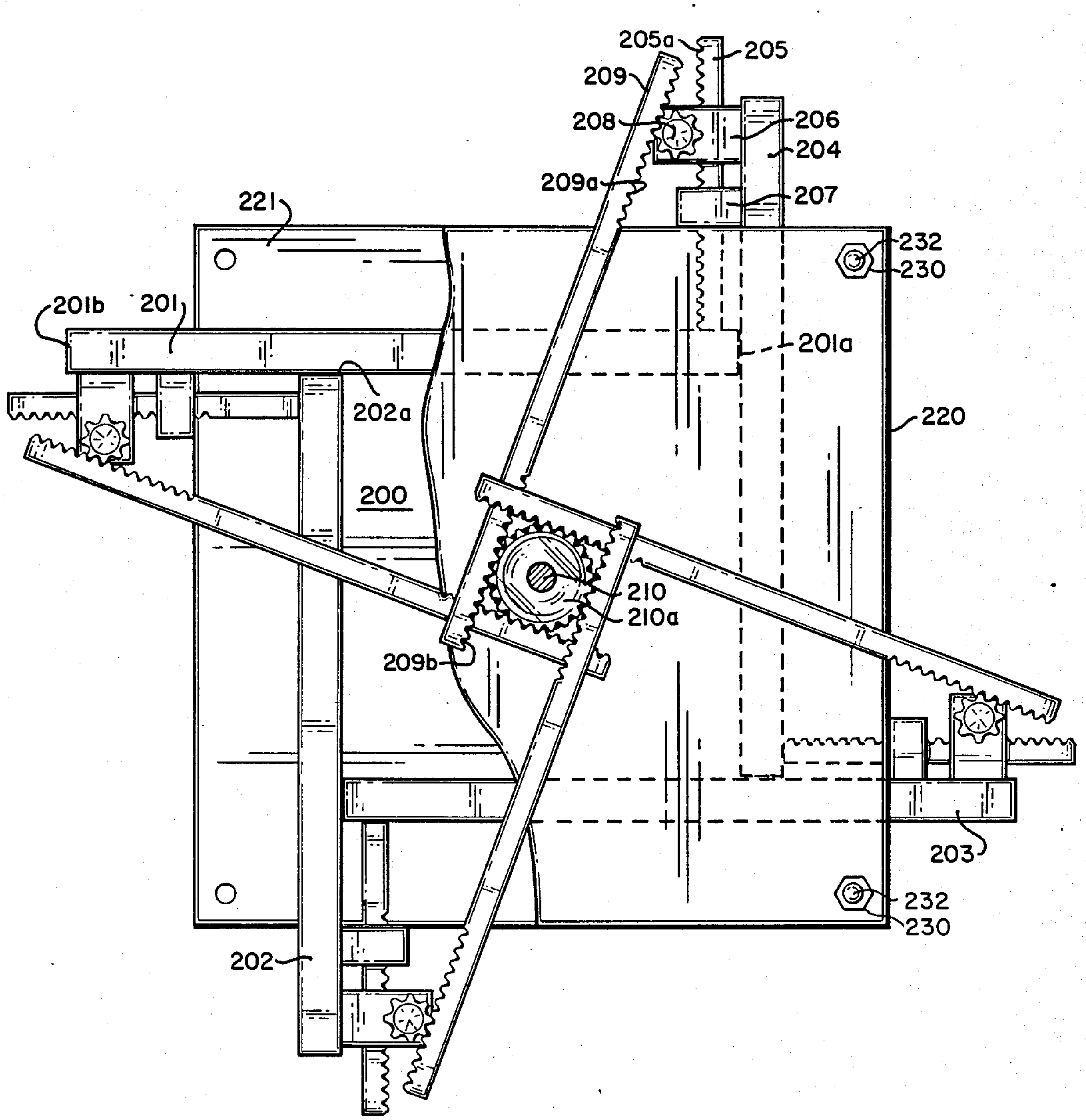
FIG. 1 is a front, elevational view cut-away view of one combustion chamber of a preferred embodiment of the apparatus of the invention.
Figure 2:
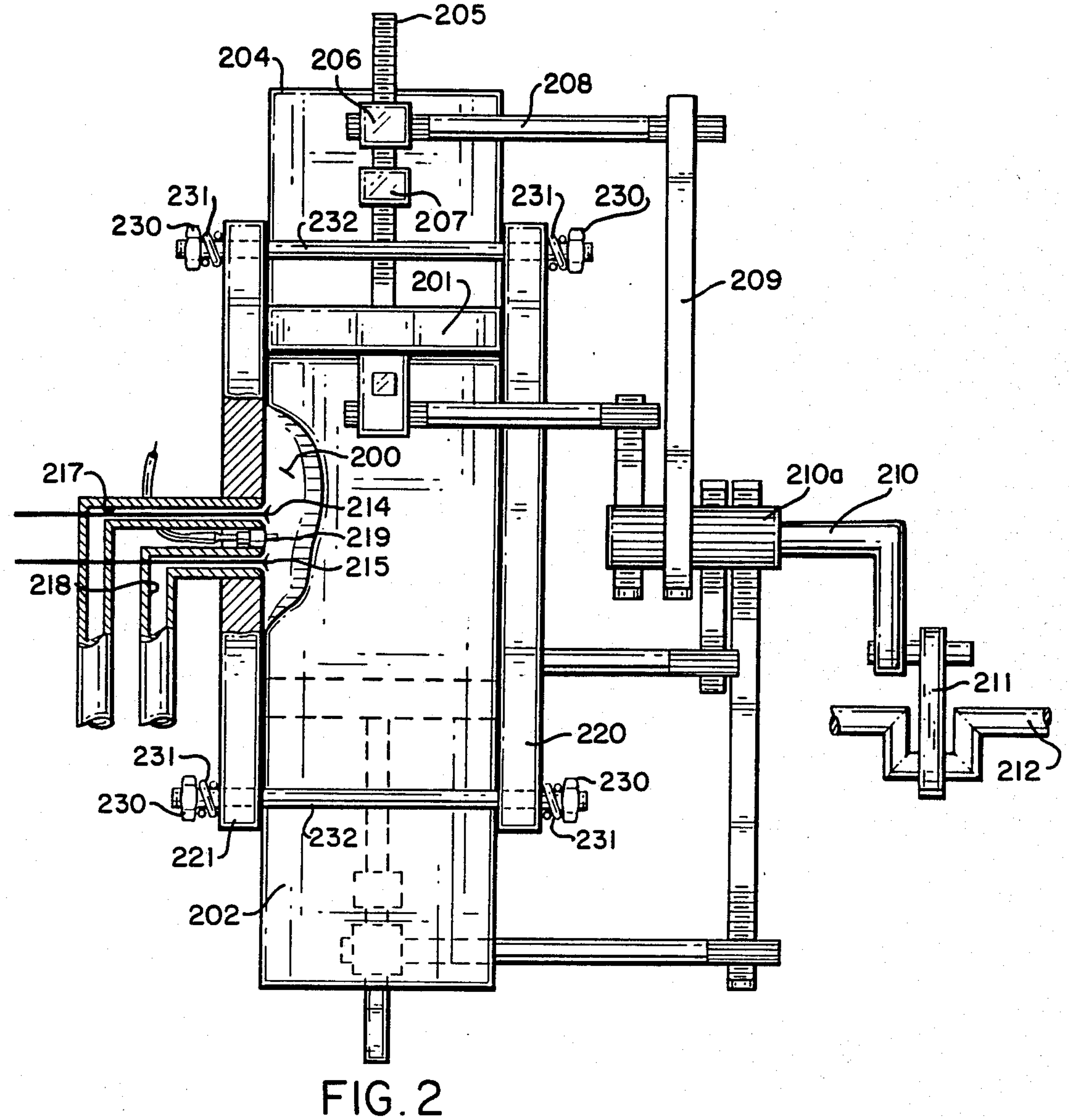
FIG. 2 is a side, elevational cut-away view of the apparatus of FIG. 1.
Figure 3:
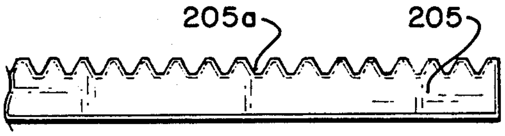
FIG. 3 is an enlarged fragmentary view of a toothed, elongated member.

Referring to the figures of drawings wherein like numbers of reference designate like elements throughout, FIG. 1 depicts an embodiment of an internal combustion engine of the invention. For ease of illustration and description, the drawings illustrate only the pertinent features of the present invention and do not show the remaining conventional features of the internal combustion engine 1, except as is apparent from FIG. 2.

In this embodiment, a chamber 200 is defined by movable walls 201, 202, 203, and 204. The walls are relatively thin and are substantially rigid, being sufficiently rigid to withstand the forces of the combustion process.

Each wall is defined by two ends. Looking at wall 201, one end 201*a* is adjacent wall 204 and is in slidable moving contact with relationship thereto. On the outside surface of wall 201, near the end 201*a*, is mounted an elongated extension means 205. The elongated extension means 205 is conveniently in a shape of a rod, although other shapes which accomplish the same purpose may also be suitably employed. The extension means 205 is substantially parallel to the adjacent wall 204 and provides reciprocal linear motion in response to the movement of wall 201.

With regard to the movement of wall 201 with respect to wall 204, it will be seen that wall 204 is provided with two collars 206 and 207 for retaining the extension means 205 in the desired relationship to wall 204. Further, collar 206 is provided with a gear 208 interior the collar for engaging teeth 205*a*, which are formed on one side of the extension means 205. Near the other end 201*b* of wall 201 are means for supporting an elongated extension from adjacent wall 202 and means for translating the reciprocal linear motion of the extension means to rotary motion.

Each wall 201, 202, 203, 204 is thus provided with similar elongated extension means, and means for supporting the extension means and for translating reciprocal linear motion into rotary motion.

Associated with each rotary translation means 208 is a means for coupling the rotary motion derived from the each movable wall 201, 202, 203, 204 into synchronous rotary motion. This is accomplished by another extension means 209, also conveniently a rod, provided with teeth 209*a* and 209*b* at each end, which engage gear 208 at end 209*a* and common gear 210 at end 209*b*. Crankshaft 210, which supports gear 210*a*, is connected through rod 211 to a smaller crankshaft 212. Crankshaft 212 rotates and is connected to the wheels of the vehicle.

In operation, when extension means 205 moves down or up, it will rotate gear 208. A rotating gear 208 moves extension means 209, which couples the rotary motion of gear 208 to rotary motion of the crankshaft 210. Crankshaft 210 is much like a pendulum in that it moves back and forth in response to the movement of extension member 209. Connection through rod 211 to a smaller crankshaft 212 will cause the crankshaft 212 to rotate, instead of swinging back and forth like crankshaft 210.

A means to permit gases to selectively enter and exit from the combustion chamber 200 is provided by a pair of inlet and exhaust valves 214 and 215, respectively, disposed in a stationary sidewall 221 and opening inwardly through sidewall 221 to provide inlet and exhaust ports 217 and 218, respectively, for gases contained in the combustion chamber 200.

An ignition means to selectively ignite gases placed in the combustion chamber 200 is provided by a spark plug 219 secured in the stationary sidewall 221, having conventional spark gap terminals extending through the sidewall 221 and into the combustion chamber 200. Fixed walls 220 and 221, together with movable walls 201, 201, 203, and 204, define the combustion chamber 200.

Walls 220 and 221 are maintained in spaced apart relationship by rods 232, which are fastened by means of springs 231 and nuts 230. In this manner, pressure is applied to the plates 220, 221 to ensure proper attachment between the plates 220, 221, 201, 202, 203, 204, so that a proper seal of chamber 200 may be achieved.

Figure 4:
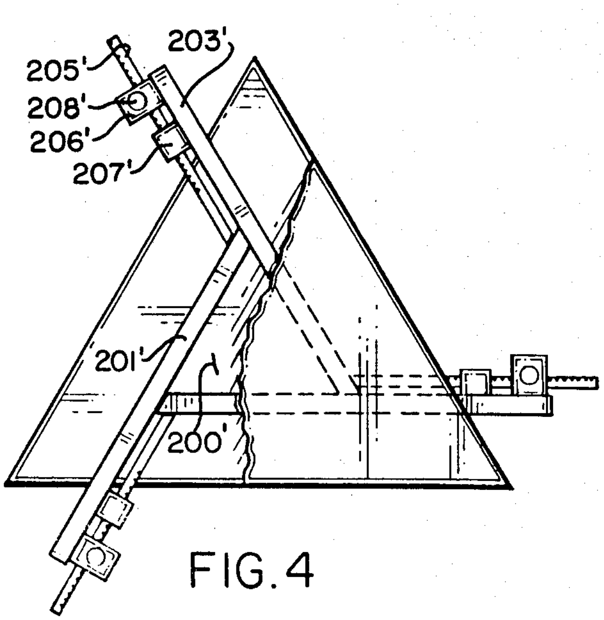
FIG. 4 is a front, elevational cut-away view of an alternative embodiment similar to FIG. 1, but illustrating a triangular as opposed to a rectangular combustion chamber.

Other preferred embodiments of the apparatus of the invention include having the combustion chamber constructed in a form of a triangular-shaped enclosure such as shown in FIG. 4, wherein numbers 200' through 208' inclusive are similar to those elements designated by numbers 201 through 208 described above.

The foregoing embodiment is simple and economical to manufacture. The contact area between moving parts is minimal, and can be reduced even more by reducing the thickness of plates 201, 202, 203, 204 to a very thin dimension so long as the material is hard and rigid enough so that the plates will not bend under the forces of combustion. Finally, any torque that occurs during combustion occurs outside the combustion chamber itself at collars 206 and 207 and their counter-parts on the other walls.

Two or more such combustion chambers 200 may be operatively associated with a single crankshaft 210 to provide the equivalent of multi-piston operation.

From the above description, it should be readily apparent that the apparatus of the invention described maybe used as follows:

Inlet value 217 opens to provide an inlet port 214 for a combustible gas to enter combustion chamber 200 via a feed hose and then closes to contain the gas in combustion chamber 200.

Movable sidewalls 201, 202, 203 and 204, bounded by stationary sidewalls 220, 221, are urged inward to lessen the internal volume of combustion chamber 200, thus compressing the contained gas. Spark plug 219 now causes a spark across its spark gap terminals which extend through sidewall 221 and into combustion chamber 200. The combustible gas ignites and forces movable sidewalls 201, 202, 203 and 204 outward. Extension means 205, one attached to each sidewall 201, 202, 203, 204, are activated by the movement of the sidewalls to rotate crankshaft 210 by the mechanical coupling described above.

After this expanding power cycle is complete, the continued crankshaft movement urges movable sidewalls 201, 202, 203 and 204 together inward, lessening the internal volume of combustion chamber 200. Simultaneous with this inward movement, exhaust valve 218 opens to provide an exit port 215 for the now combusted gas to allow it to exit the engine system via an exhaust pipe, thereby completing the cycle of the engine.

Once exhausted, inlet valve 217 opens to provide an inlet for more combustible gas to enter the system and begin the entire sequence again.

Figure 5:
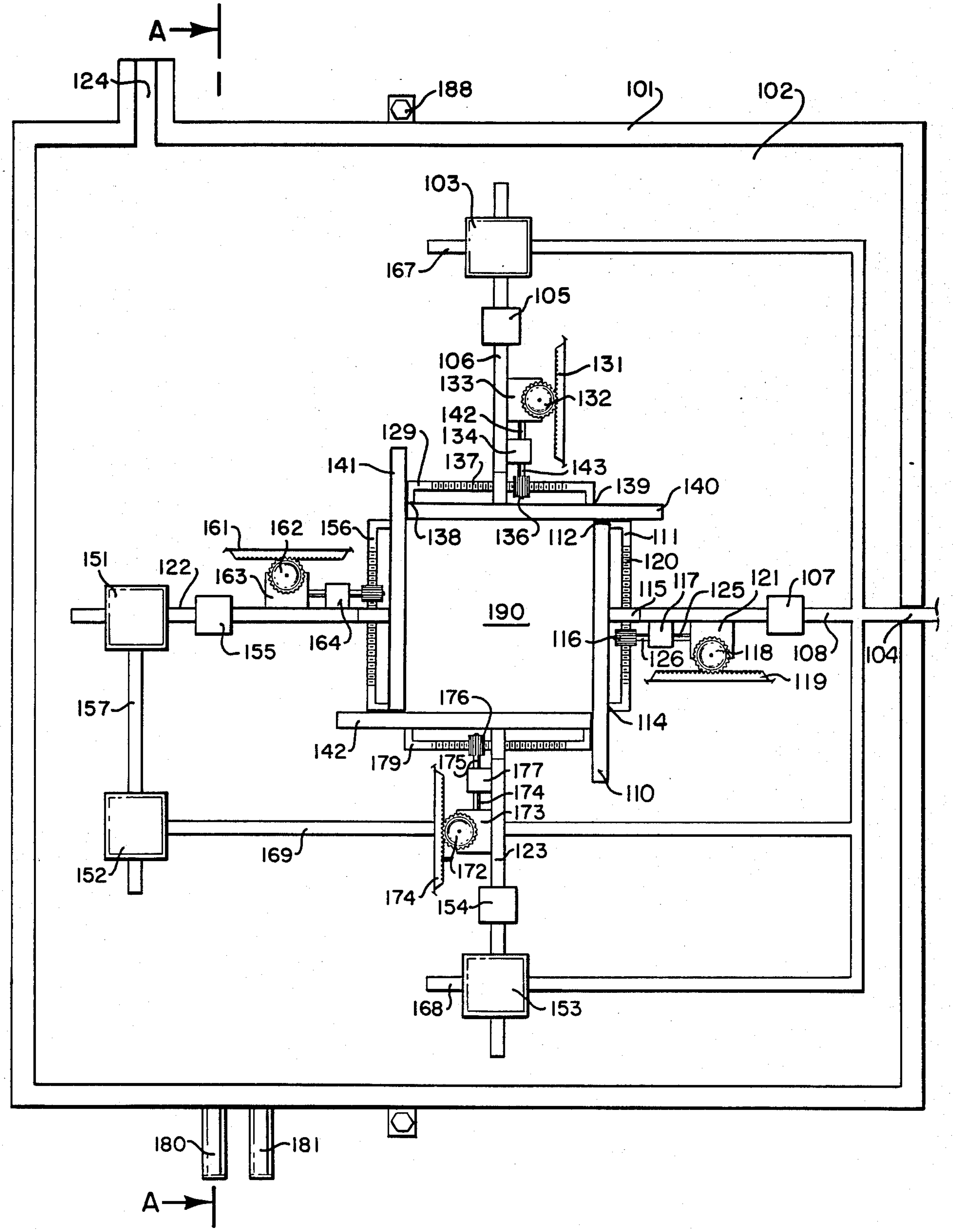
FIG. 5 is a side elevational cut-away view of one combustion chamber of another preferred embodiment of the apparatus of the invention.
Figure 6:
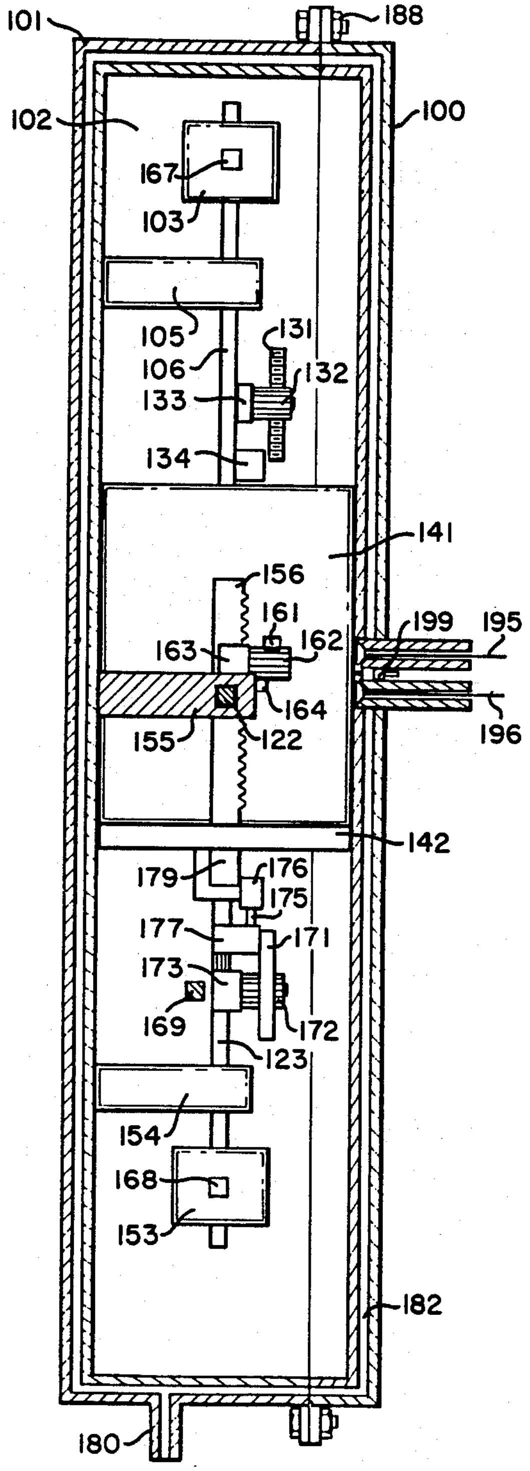
FIG. 6 is a view taken along the line A-A of FIG. 5.
Figure 7:
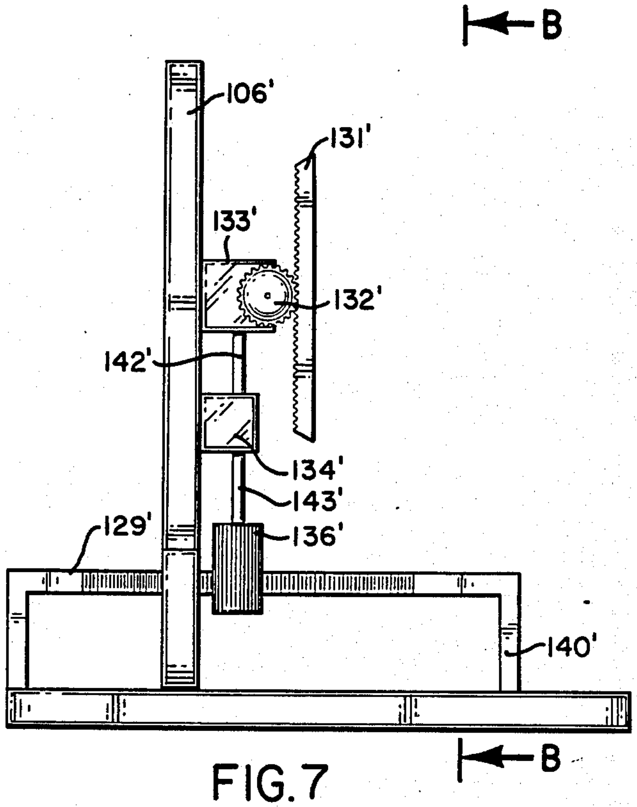
FIG. 7 is a side elevational view, similar to that of FIG. 5, but of one movable wall and its associated movement translation apparatus.
Figure 8:
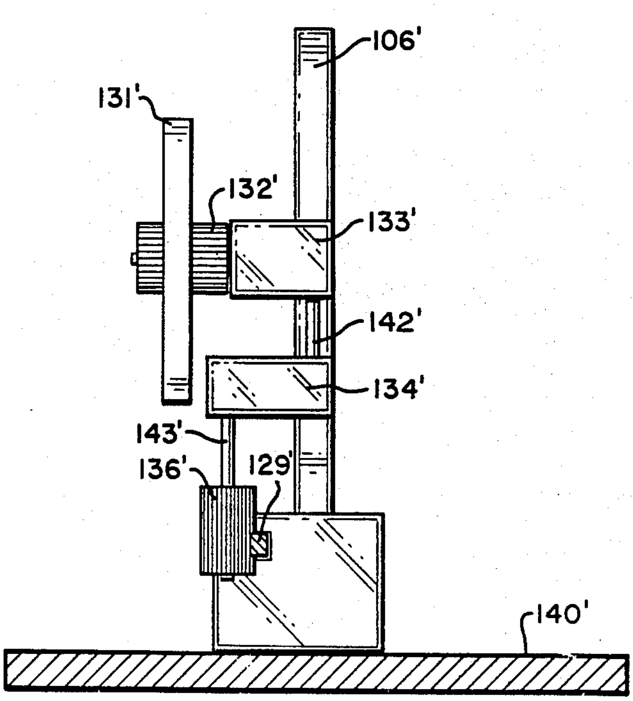
FIG. 8 is a front elevational view of the movable wall depicted in FIG. 7, taken along the line B—B thereof.

In another embodiment, FIG. 5 depicts a side view of an internal combustion engine having a cover 101, which, together with cover 100 (shown in FIG. 6), seals all parts. With reference to FIG. 6, the vertical sides 100 and 101 also serve as stationary walls of the chamber.

In FIG. 5, engine oil is provided in chamber 102 to lubricate all engine parts. Connecting port means 124 connects to a reservoir (not shown) so that when combustion chamber 190 expands, excessive engine oil goes out through the connecting port means 124, and when the volume of chamber 190 contracts, engine oil flows into the engine through the connecting port means 124.

In this embodiment, the movable walls are denoted as 110, 140, 141 and 142. A bar 129 with ends 138 and 139 is fixed to wall 140, Teeth 137 are provided on one side of the bar 129. Elongated extension bar 106 has an opening near one end to permit bar 129 to pass orthogonally therethrough. The configuration of bars 106 and 129 is such as to render bar 106 normal to movable wall 140.

A guide 105 is fixedly attached to cover 101, and is provided with guide means for accepting bar 106 in reciprocating linear fashion, keeping the motion of bar 106 normal to movable wall 140.

Teeth 131 are fixedly attached to the cover 101. Gear 132 engages teeth 131, and is maintained in a gear box 133, which is fixedly attached to the bar 106. When the bar 106 moves outward from the chamber 190, gear 132 rotates clockwise, and through bars 142 and 143, gear 136 rotates so that wall 140 moves laterally to the left. The gears 132 and 136 are configured such that the speed of wall 140 moving laterally is equal to the speed of bar 106 moving vertically. In a similar fashion, bars 122, 123 and 108 move at the safe speed as bar 106, so that the lateral movements of the wall 141 are also at the same speed, keeping walls 140 and 141 in contact. Similarly, walls 140 and 110, and 142, and 142 and 141 are always maintained in contact during their lateral movements and during the vertical movements of the bars 106, 122, 123 and 128. Consequently, the chamber 190 remains sealed at all times during expansion and contraction.

It is seen that each of the other walls 141, 142, 110 are respectively provided with bars 156, 179, 111, each having teeth on one side thereof. Elongated extension bars 122, 123, 108 have an opening near one end to permit bars 156, 179, 111, respectively, to pass orthogonally therethrough.

Guides 155, 154, 107, fixedly attached to the cover 101, are provided with guide means for accepting elongated extension bars 122, 123, 108, respectively.

Teeth 161, 171, 119 are fixedly attached to the cover 101. Gears 162, 172, 118 engage teeth 161, 171,119, respectively, and are maintained in respective gear boxes 163, 173, 121, fixedly attached to elongated extension bars 122, 123, 108, respectively. The motion is coupled in the same fashion as described above for movable wall 140 to cause movable walls 141, 142, 110 to move laterally with contraction and expansion of the combustion chamber 190 as the associated extension bars 122, 123, 108, respectively, move in and out.

Gear 103 is provided to redirect the movement of bar 106 normal to its movement. Gears 151 and 152 are provided to redirect the movement of bar 122 to the reverse of its movement. Gear 153 is provided to redirect the movement of bar 123 normal to its movement. All such movements are then collected by bar 104, which is connected to a crankshaft (not shown), thereby transferring thrust outward from the engine.

Ports 180 and 181 provide inlet means and outlet means, respectively, to permit cooling water to enter the interior of the covers 100 and 101 for circulation therethrough to carry off heat generated by the engine combustion process. Screw 108 seals the covers 100, 101.

FIG. 6 is a front elevational view of FIG. 5. A spark plug 199 is provided, along with fuel inlet means 195 and gas exhaust means 196, to permit fuel entry into the combustion chamber 190, combustion therein, and gas exhaust therefrom.

The spark plug 199 may be eliminated in the instance that diesel fuel is employed in the combustion process. In such a case, a fuel injection device (not shown) is substituted for the spark plug 199.

Figure 9:
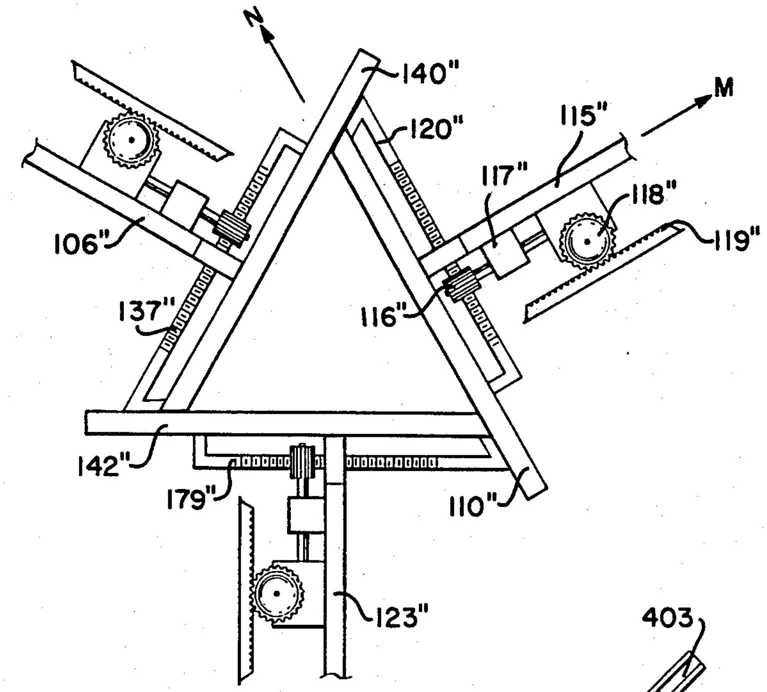
FIG. 9 is a side elevational of an alternative embodiment similar to that of FIG. 5, but illustrating a triangular as opposed to a rectangular combustion chamber.

An alternative embodiment is depicted in FIG. 9, showing three movable walls 140'', 142'', 110'' forming a triangular-shaped combustion chamber, with the double-primed numbers referring to the same analogous parts as the unprimed numbers in FIG. 5.

The operation of the apparatus depicted in FIG. 9 is the same as that in FIG. 5, except that the speed that wall 110'' moves along the vector N is $\sqrt{3}$ times the speed of bar 115'' moving along the vector M in order to have the desired sealing of the combustion chamber. Gears 118'' and 116'' have appropriate diameters and number of teeth to achieve this result.

Figure 10:
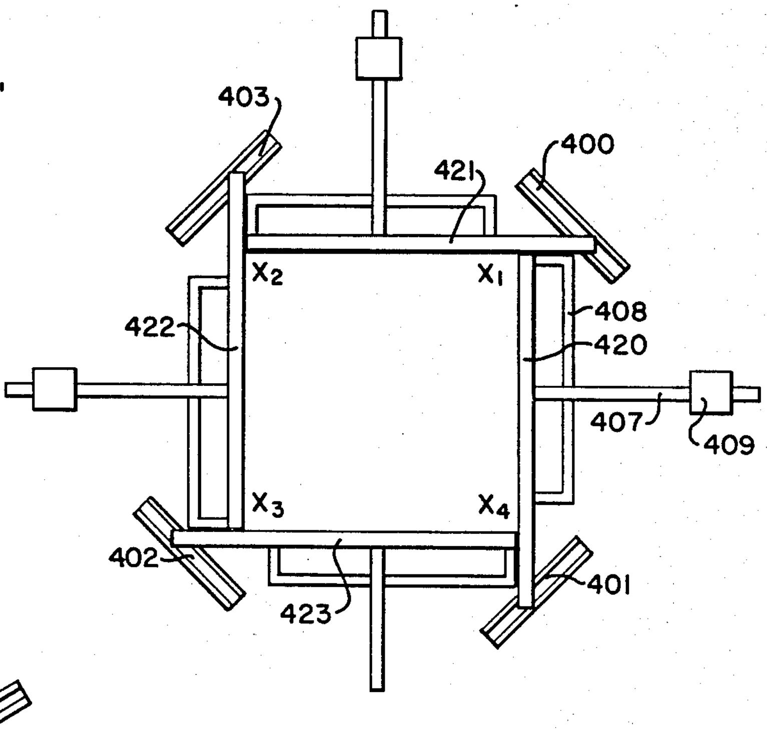
FIG. 10 is a view similar to that of FIG. 5, but illustrating an alternative embodiment.

FIG. 10 is a preferred embodiment of FIG. 5, but having fewer parts than required by that version. In FIG. 10, parts similar to 131, 132, 133, 142, 143, 134 136 and teeth 137, along with their analogous parts associated with the other walls, are all eliminated. In their place, tracks 400, 401, 402, 403 are provided.

Tracks 400 and 402 are parallel to $X_2$–$X_4$. When bar 407 moves laterally, wall 420 moves normal thereto at the same speed. Since walls 421, 420, 422 and 423 move toward or away from the center of the combustion chamber at the same speed, wall 420 moves with the same speed as wall 421. Therefore, walls 421 and 420 are always in sealing contact with each other. The same holds true for walls 421 and 422, walls 422 and 423, and walls 423 and 420. Thus, the combustion chamber remains sealed at all times.

Figure 12:
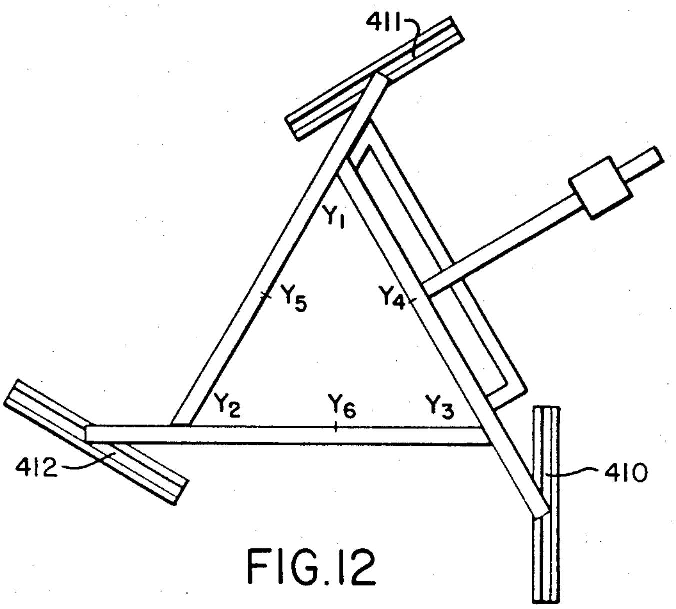
FIG. 12 is a view similar to that of FIG. 9, but illustrating an alternative embodiment similar to that of FIG. 10.

FIG. 12 is based on the same principle of operation as FIG. 10, except that track 410 is parallel with $Y_1$–$Y_6$. Track 411 is parallel with $Y_2$–$Y_4$, and track 412 is parallel with $Y_3$–$Y_5$, where $Y_1$–$Y_6$ is vertical to $Y_2$–$Y_3$, $Y_2$–$Y_4$ is vertical to $Y_1$–$Y_3$ and $Y_3$–$Y_5$ is vertical to $Y_1$–$Y_2$.

Figure 11:
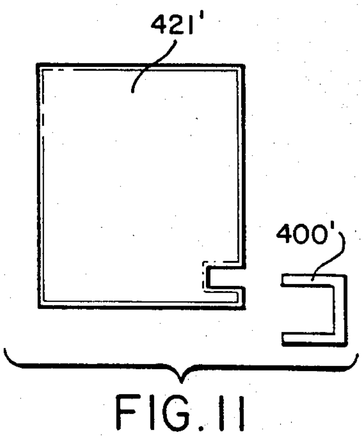
FIG. 11 is a side elevational view of a portion of FIG. 10.

The movements of the walls 420, 421, 422 and 423 are regulated by tracks 401, 400, 403 and 402, respectively. FIG. 11 depicts the front surface 421' of wall 421 and its unassembled relationship with a portion 400' of the track 400. The convex portion of wall 421' fits into the concave portion of track 400'. Thus, the position of the wall 421 is regulated by the track 400.

Referring again to FIG. 5, it is clear that the walls 140, 141, 142 and 110 are constantly moving against each other and against the covers 100 and 101. The edges of the walls will eventually wear out, and thus a perfect seal will no longer be possible. FIGS. 13 to 20 provide a solution to prevent such loss of sealing.

Figure 13A:
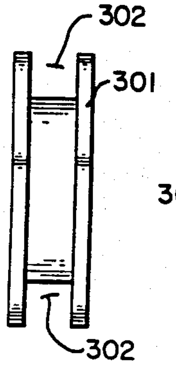
FIG. 13*a* is a front view of a movable wall employed in the practice of the invention and provided with means for accepting a wear-reducing member.
Figure 13B:
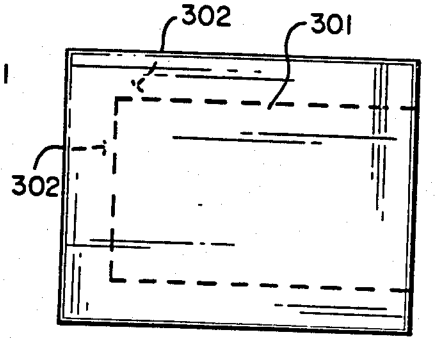
FIG. 13*b* is a side elevational view of the movable wall of FIG. 13*a;*
Figure 19:
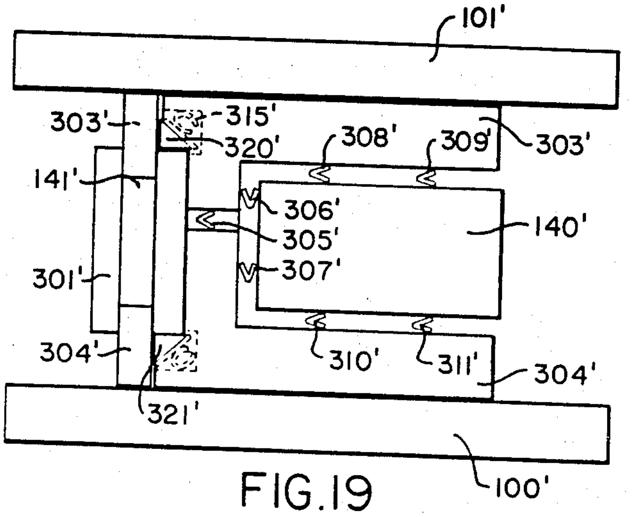
FIG. 19 is a side elevational view of the assembly of the parts depicted in FIGS. 13 and 14 with respect to the stationary walls.

FIG. 13 shows both a front view (FIG. **13*a*) and a side view (FIG. 13*b*) of a movable wall. Slots 302, defined by edges 301, are provided which contain parts shown in FIG. 14. FIG. 19 depicts how the parts shown in FIGS. 13 and 14** cooperate together.

Figure 14:
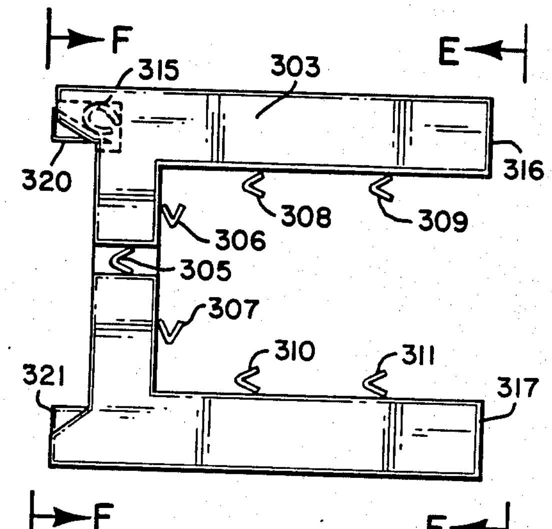
FIG. 14 is a top plan view of a wear-reducing member utilized in conjunction with a movable wall.
Figure 15:
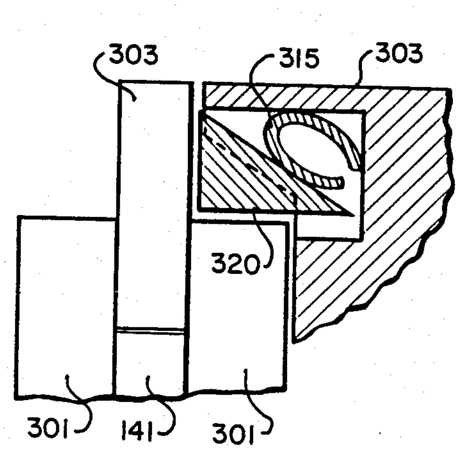
FIG. 15 is an enlarged fragmentary view of a portion of FIG. 14.
Figure 16:
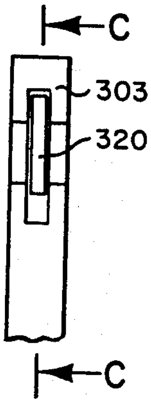
FIG. 16 is a side elevational view of the enlarged fragmentary view of FIG. 15, with the view of FIG. 15 being taken along the line C—C of FIG. 16.
Figure 17:
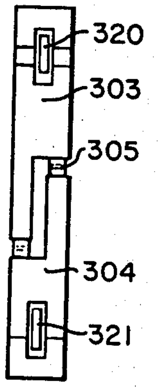
FIG. 17 is a side elevational view taken along the line F—F of FIG. 14.
Figure 18:
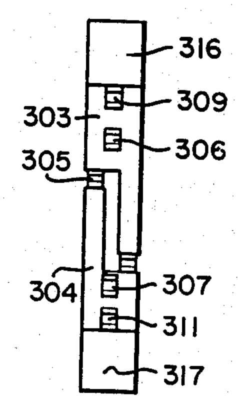
FIG. 18 is a side elevational view taken along the line E—E of FIG. 14.

A wear-reducing member, shown in FIG. 14, acts like a piston ring, but is U-shaped. Referring to FIG. 19, which shows the combination of FIGS. 13 and 14, the purpose of every part is made clear. In FIG. 19, covers 101' and 100' serve the same purposes as covers 101 and 100 in FIG. 5.

In FIG. 14, a triangular portion 320 is shown. A C-shaped spring 315 forces the triangular portion 320 to attach to the appropriate wall. V-shaped parts 305–311 are metal springs, which engage against members 303, 304 to keep them in contact with the appropriate walls or covers. As shown in FIG. 19, springs 308' and 309' push member 303' against cover 101' so that contact remains tight. Springs 306' and 307' push against members 303' and 304' to maintain contact thereof against wall 141'. Spring 305' acts to push members 303' and 34' apart so that these members can maintain tight contact against covers 100' and 101', respectively.

Figure 20:
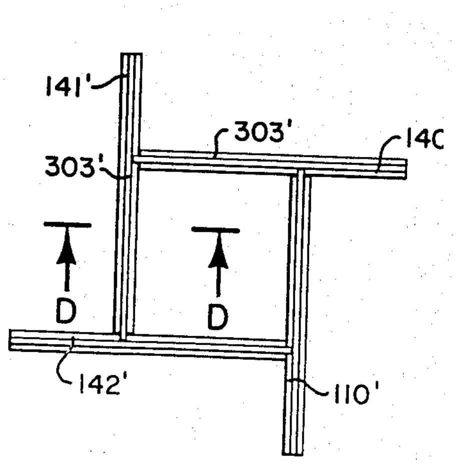
FIG. 20 is a view similar to that of FIG. 5, showing the relationship of the movable walls to each other and the associated wear-reducing members.

FIG. 20 is a top plan view of FIG. 19, similar to that of FIG. 5, showing the joining of the four walls 140', 141', 142' and 110' with the top portion 303 of the wear-reducing member visible.

The invention described above is, of course, susceptible to many variations, modifications and changes, all of which are within the skill of the art. It should be understood that all such variations, modifications and changes are within the spirit and scope of the invention and of the appended claims. Similarly, it will be understood that it is intended to cover all changes, modifications and variations of the examples of the invention herein disclosed for the purpose of illustration which do not constitute departures from the spirit and scope of the invention.

I claim:

1. A wear-reducing member for reducing the wear of a movable wall provided with slots along top, bottom and side edges and bounded with stationary walls along said top and bottom edges and with another movable wall along said side edge, said member comprising a U-shaped member provided with means in the bight of said U for cooperatively engaging in said slots of said movable wall to urge portions of said member outward against said stationary walls and further provided with means for urging portions of said member inward against said another movable wall which is adjacent thereto.

2. The wear-reducing member as defined by claim 1 wherein said urging means comprises springs.

* * * * *